A. FOSS AND B. F. HALVORSEN.
METALLURGICAL PROCESS.
APPLICATION FILED APR. 28, 1919.
1,340,480.
Patented May 18, 1920.
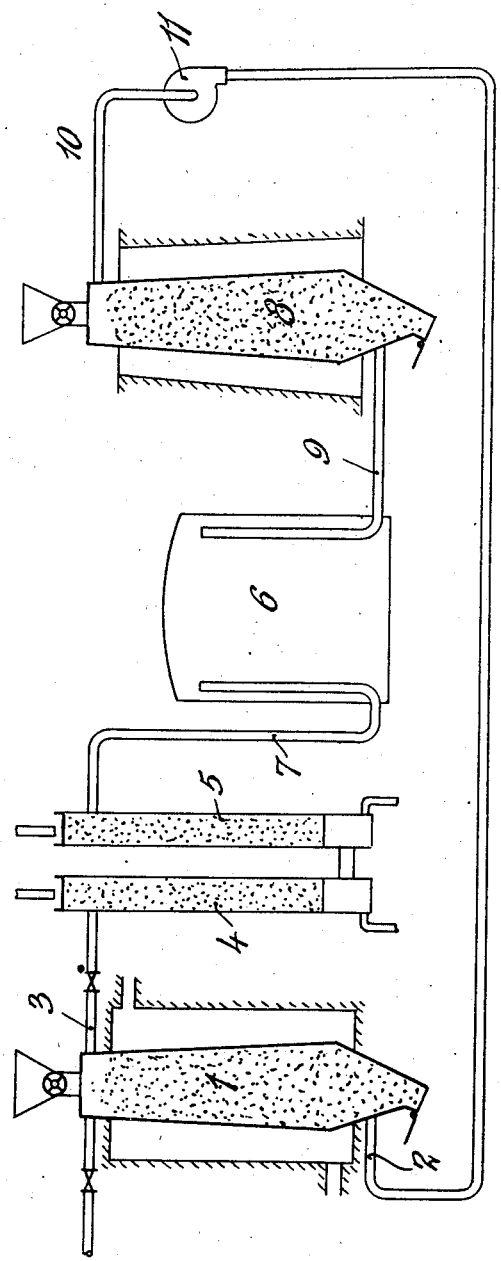
Inventors
Antonius Foss
Birger Fjeld Halvorsen,
By
Atty.

UNITED STATES PATENT OFFICE.

ANTONIUS FOSS AND BIRGER FJELD HALVORSEN, OF CHRISTIANIA, NORWAY, ASSIGNORS TO NORSK HYDRO-ELEKTRISK KVAELSTOFAKTIESELSKAB, OF CHRISTIANIA, NORWAY.

METALLURGICAL PROCESS.

1,340,480.  Specification of Letters Patent.  Patented May 18, 1920.

Application filed April 28, 1919. Serial No. 293,109.

*To all whom it may concern:*

Be it known that we, ANTONIUS FOSS, of Solligaten 7, and BIRGER FJELD HALVORSEN, of Oscarsgate 71, Christiania, in the Kingdom of Norway, have invented certain new and useful Improvements in Metallurgical Processes; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to processes in which materials are reacted upon with reducing gases and has for its object a method of preparing from carbon dioxid a reducing gas suitable for such processes.

The reducing agent most commonly employed for the recovery of metals from their oxids consists of solid carbonaceous materials. As known it is also possible to effect the reduction with carbon monoxid. This gas however is produced by the combustion of solid carbonaceous materials and it will therefore in most instances be the most profitable course to use the latter substance directly as a reducing agent. The state of things would however be quite different if it were possible to convert the carbon dioxid —which besides occurring in nature in great quantities also is produced in a great number of industrial processes—into carbon monoxid without the use of carbon. Countries such as Norway, where coal deposits of any importance do not occur would then be enabled to produce iron and other metals in great quantities independent of the supply of coal from abroad.

According to the present invention it is now possible to effect the reduction of carbon dioxid in such a manner that the process can be profitably carried into effect on a commercial scale.

A characteristic feature of the process consist therein that metal sulfids ($FeS_2$, $FeS$, $MoS_2$, $ZnS$ etc.) are used as a reducing agent for the carbon dioxid. The process is based upon the observation, that carbon dioxid when passed in contact with metal sulfids react with the sulfur of the sulfids at a comparatively low temperature. When iron sulfid is reacted upon the reactions could be illustrated by the following equations: $FeS+3CO_2 = FeO+3CO+SO_2$. $2FeS+7CO_2=F_2O_3+7CO+2SO_2$. The reaction commences at about 600° C. but proceeds better at higher temperatures up to about 1000° C. if the sulfid treated is not fused.

Owing to the fact that sulfur dioxid is obtained besides the carbon monoxid it becomes possible to produce the carbon monoxid at a sufficiently low cost to allow of its use in metallurgical processes. The sulfur dioxid can be utilized for the manufacture of sulfuric acid, sulfite of lime, liquid sulfur dioxid and other products and thus carries a substantial part of the costs.

When the process is used for the extraction of metals one may for instance proceed as follows, reference being had to the accompanying drawing, which diagrammatically illustrates a plant for carrying the process into effect.

In an apparatus 1 the sulfid is heated to the reduction temperature, which is somewhat different according to the metal in question, carbon dioxid or carbon dioxid bearing gases, being blown through the charge from the pipe 2. The gas mixture leaving the apparatus at 3 substantially consists of carbon monoxid and sulfur dioxid. The sulfur dioxid is removed by passing the gas through scrubbers 4 and 5 from which the purified gas carbon monoxid enters the gasometer 6 through the pipe 7, the gasometer serving also as a pressure equalizer. The gas from the gasometer enters an apparatus 8 through a pipe 9, the said apparatus 8 containing a metal oxid to be reduced, heated to a suitable temperature.

By the reduction of the metal oxid the carbon monoxid is oxidized to carbon dioxid, which through the pipe 10, 2 is returned to the apparatus 1 by means of the blower 11.

Carbon being in this process not consumed in a quantity beyond what is necessary to replace unavoidable losses it is possible by means of a small quantity of a circulating carbon dioxid to produce large quantities of metal when such instances are left out of consideration, in which carbon monoxid is decomposed giving off carbon which is taken up into the metal.

In this process a larger quantity of carbon monoxid is obtained than what is required to reduce the metal oxid formed from the sulfid. This will be seen from the equations. Thus when the metal contained in the sulfid employed is to be extracted it is possible to treat in the metal reduction apparatus a considerably larger quantity of oxid, than what is obtained in the sulfid reaction apparatus.

In places where carbon dioxid or carbon dioxid bearing gases are available in abundance the reuse of the carbon dioxid may under certain conditions be left out of consideration, that is the circulation of the gases could be dispensed with the gases leaving the metal reduction chamber being then let out into the open air or they could also be utilized in other ways.

We claim:

1. The process which comprises passing carbon-dioxid in contact with a metal sulfid at a temperature sufficient to reduce the carbon-dioxid to carbon-monoxid with the simultaneous formation of sulfur dioxid, and removing the sulfur dioxid from the gas mixture.

2. The process which comprises passing carbon dioxid gas in contact with a metal sulfid at a temperature sufficient to reduce the gas to oxid and simultaneously form sulfur dioxid, removing the sulfur dioxid from the gas mixture, converting the carbon monoxid into carbon dioxid and returning it into the cycle of operations.

3. The process which comprises passing carbon dioxid gas in contact with a metal sulfid at a temperature sufficient to reduce the gas to monoxid and form sulfur dioxid, removing the sulfur dioxid, reducing a metallic compound by said monoxid and returning the resulting gas into the cycle of operations.

4. The process which comprises passing carbon dioxid gas in contact with oxidizable sulfids at a temperature sufficient to reduce the dioxid to monoxid with the simultaneous formation of sulfur-dioxid, scrubbing the gas mixture to remove the sulfur dioxid, reducing the oxid compounds by the carbon monoxid and returning the resulting gases for action upon sulfids.

In testimony that we claim the foregoing as our invention, we have signed our names in presence of two subscribing witnesses.

ANTONIUS FOSS.
BIRGER FJELD HALVORSEN.

Witnesses:
A'MEDENSHOU,
A. B. COOK.